(12) United States Patent
Casado Magaña et al.

(10) Patent No.: US 9,766,630 B2
(45) Date of Patent: Sep. 19, 2017

(54) DETERMINING A DESCENT TRAJECTORY DESCRIBED BY AN AIRCRAFT INTENT DESCRIPTION LANGUAGE (AIDL)

(71) Applicant: The Boeing Company, Chicago, IL (US)

(72) Inventors: Enrique Juan Casado Magaña, Madrid (ES); Luis Pedro D'Alto, Madrid (ES); Miguel Vilaplana Ruiz, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/703,506

(22) Filed: May 4, 2015

(65) Prior Publication Data
US 2015/0338853 A1  Nov. 26, 2015

(30) Foreign Application Priority Data

May 23, 2014  (EP) .................................... 14382181

(51) Int. Cl.
*G05D 1/06* (2006.01)
*G05D 1/10* (2006.01)
(Continued)

(52) U.S. Cl.
CPC ........... *G05D 1/0676* (2013.01); *G05D 1/101* (2013.01); *G08G 5/0026* (2013.01);
(Continued)

(58) Field of Classification Search
CPC ........ G05D 1/0676; G05D 1/101; G05D 1/00; G05D 1/0653; G08G 5/0043;
(Continued)

(56) References Cited

U.S. PATENT DOCUMENTS 5,978,715 A * 11/1999 Briffe .................. G05D 1/0808
  244/1 R
6,038,498 A *  3/2000 Briffe ..................... G01C 23/00
  244/1 R (Continued)

FOREIGN PATENT DOCUMENTS

EP  2040137 A1    3/2009
EP  2667273 A1   11/2013
EP  2685440 A1 *  1/2014 ........... G08G 5/0008

OTHER PUBLICATIONS

Krozel, Jimmy, and Dominick Andrisani. Intent inference with path prediction. Journal of guidance, control, and dynamics 29.2 (2006) 225-236.*

(Continued)

*Primary Examiner* — Yonel Beaulieu
*Assistant Examiner* — Angelina Shudy
(74) *Attorney, Agent, or Firm* — Hanley, Flight & Zimmerman, LLC

(57) ABSTRACT

Determining a descent trajectory described by an Aircraft Intent Description Language (AIDL) is disclosed. An example method includes accessing historical flight data for a recorded flight trajectory, the recorded flight trajectory having been performed by a first aircraft type of multiple aircraft types and for a first airline of multiple airlines; estimating, using a processor, an aircraft intent parameter and an initial condition of the recorded flight trajectory based on an aircraft intent description language (AIDL) representation of the recorded flight trajectory; and mapping, using the processor, the aircraft intent parameter and the initial condition to a combination of the first aircraft type, the first airline, and an identified intended descent procedure.

22 Claims, 6 Drawing Sheets

(51) Int. Cl.
*G08G 5/00* (2006.01)
*G08G 5/02* (2006.01)

(52) U.S. Cl.
CPC .......... *G08G 5/0043* (2013.01); *G08G 5/025* (2013.01); *G08G 5/0082* (2013.01)

(58) Field of Classification Search
CPC .... G08G 5/0026; G08G 5/0082; G08G 5/025; G08G 5/00; G08G 5/0021; G08G 5/045; G01S 1/16; G01S 1/18; B64D 45/00; B64D 31/00; B64F 1/18; B64C 27/56; B64C 13/00
USPC ............ 701/18, 5, 3, 14; 340/945, 951, 963, 340/961; 244/75.1, 183
See application file for complete search history.

(56) References Cited

U.S. PATENT DOCUMENTS

| | | | | |
|---|---|---|---|---|
| 6,112,141 | A * | 8/2000 | Briffe | G01C 23/00 345/1.3 |
| 6,199,008 | B1 * | 3/2001 | Aratow | G01C 23/00 701/120 |
| 7,457,690 | B2 * | 11/2008 | Wilson, Jr. | G08G 5/0013 701/120 |
| 8,290,696 | B1 * | 10/2012 | Sridhar | G08G 5/045 701/1 |
| 8,332,084 | B1 * | 12/2012 | Bailey | G01W 1/10 701/10 |
| 8,723,686 | B1 * | 5/2014 | Murray | G08G 5/0021 340/901 |
| 8,775,062 | B2 * | 7/2014 | Becher | G08G 5/02 342/36 |
| 9,041,560 | B2 * | 5/2015 | Venkataswamy | G08G 5/0013 340/457.1 |
| 9,076,327 | B1 * | 7/2015 | Baiada | G08G 5/0091 |
| 9,310,222 | B1 * | 4/2016 | Suiter | G01C 23/005 |
| 9,620,023 | B2 * | 4/2017 | Magana | G08G 5/0052 |
| 2004/0249519 | A1 * | 12/2004 | Frink | B64D 45/0015 701/3 |
| 2006/0089760 | A1 * | 4/2006 | Love | G08G 5/0039 701/4 |
| 2007/0032921 | A1 * | 2/2007 | Allen | G01C 23/005 701/3 |
| 2008/0065352 | A1 * | 3/2008 | Coulmeau | G01G 19/414 702/175 |
| 2010/0114922 | A1 * | 5/2010 | Gayraud | G08G 5/065 707/758 |
| 2010/0305781 | A1 * | 12/2010 | Felix | G05D 1/101 701/3 |
| 2011/0208374 | A1 * | 8/2011 | Jayathirtha | G05D 1/0676 701/5 |
| 2011/0264313 | A1 * | 10/2011 | Sampath | G08G 5/0013 701/16 |
| 2012/0191332 | A1 * | 7/2012 | Sawhill | G08G 5/0013 701/120 |
| 2012/0215434 | A1 * | 8/2012 | Subbu | G08G 5/0013 701/120 |
| 2012/0245834 | A1 * | 9/2012 | Klooster | G08G 5/0039 701/120 |
| 2013/0027226 | A1 * | 1/2013 | Cabos | G08G 5/0013 340/961 |
| 2013/0046422 | A1 * | 2/2013 | Cabos | G08G 5/0034 701/3 |
| 2013/0080043 | A1 * | 3/2013 | Ballin | G08G 5/0034 701/120 |
| 2013/0110387 | A1 * | 5/2013 | Castillo-Effen | G08G 5/0095 701/120 |
| 2013/0278444 | A1 * | 10/2013 | Venkataswamy | G08G 5/0013 340/972 |
| 2013/0317670 | A1 * | 11/2013 | Magana Casado | G05D 1/101 701/3 |
| 2014/0277853 | A1 * | 9/2014 | Castillo-Effen | G08G 5/0095 701/3 |
| 2014/0343765 | A1 * | 11/2014 | Suiter | G08G 5/0056 701/18 |
| 2014/0358415 | A1 * | 12/2014 | McDonald | G05D 1/101 701/120 |
| 2015/0066363 | A1 * | 3/2015 | D'Alto | G01C 21/20 701/518 |
| 2015/0081197 | A1 * | 3/2015 | Gaertner | G08G 5/0021 701/120 |
| 2015/0210405 | A1 * | 7/2015 | Casado Maga | B64F 5/00 701/3 |
| 2015/0253779 | A1 * | 9/2015 | Navarro | G05D 1/101 701/14 |
| 2015/0279218 | A1 * | 10/2015 | Irrgang | G08G 5/0039 701/3 |
| 2016/0093217 | A1 * | 3/2016 | Hale | G08G 5/0026 701/120 |
| 2016/0093218 | A1 * | 3/2016 | Hale | G08G 5/003 701/120 |
| 2016/0093219 | A1 * | 3/2016 | Bailey | G08G 5/0013 701/120 |
| 2016/0093221 | A1 * | 3/2016 | Bailey | G08G 5/0039 701/120 |
| 2016/0093222 | A1 * | 3/2016 | Hale | G08G 5/0039 701/120 |
| 2016/0217693 | A1 * | 7/2016 | Samuthirapandian | G01C 23/00 |
| 2017/0076611 | A1 * | 3/2017 | Shamasundar | G08G 5/0013 |

OTHER PUBLICATIONS

European Patent Office, "Extended European Search Report," issued in connection with Application No. 14382181.7, Dec. 11, 2014, 8 pages.

Thipphavong et al., "Adaptive Algorithm to Improve Trajectory Prediction Accuracy of Climbing Aircraft," Journal of Guidance, Control, and Dynamics vol. 36, No. 1, Jan.-Feb. 2013, 10 pages.

Alligier et al., "Ground-based Estimation of the Aircraft Mass, Adaptive vs. Least Squares Method," 10th USA/Europe Air Traffic Management Research and Development Seminar, Jun. 2013, 10 pages.

* cited by examiner

DETERMINING A DESCENT TRAJECTORY DESCRIBED BY AN AIRCRAFT INTENT DESCRIPTION LANGUAGE (AIDL)

FIELD OF THE DISCLOSURE

This disclosure relates to a method for improving the accuracy of the determination, or prediction, of arrival trajectories based on the use of historical flight recorded data of the traffic within a specific area approaching a designated airport.

BACKGROUND

In the Terminal Maneuvering Area (TMA), the increased accuracy of the prediction of descending trajectories leads to an improved efficiency of the arrival management procedures. However, the prediction errors reduce the capability of exploiting the resources to the maximum because the knowledge of the future evolution of the traffic with time lacks precision.

These prediction errors depend strongly on the architecture of the Trajectory Predictor (TP) used and its limitations describing aircraft trajectory. Conventional TPs are limited in the way that they can describe the intended trajectory and, therefore, there are intrinsic prediction errors that are directly related to such limitations.

The typical approach known in the state of the art is to formulate a set of assumptions which describe how the aircraft are operated during their approach to the destination. These assumptions normally take into consideration the aircraft limitations (i.e. flight envelope, environmental envelope, etc.) and the airspace constraints (i.e. standard procedures altitude and airspeed restrictions, etc.), and result in a static aircraft intent description which provides the same predictions for all aircraft of the same model under identical weather conditions starting at the same initial conditions.

The predictions errors are accepted as the limitations of the considered TP which determines the capability of the Arrival Manager (AM).

SUMMARY

Disclosed example methods include accessing historical flight data for a recorded flight trajectory, the recorded flight trajectory having been performed by a first aircraft type of multiple aircraft types and for a first airline of multiple airlines. The example methods further include estimating an aircraft intent parameter and an initial condition of the recorded flight trajectory based on an aircraft intent description language (AIDL) representation of the recorded flight trajectory. The example methods further include mapping the aircraft intent parameter and the initial condition to a combination of the first aircraft type, the first airline, and an identified intended descent procedure.

BRIEF DESCRIPTION OF THE DRAWINGS

The novel features believed characteristic of the illustrative examples are set forth in the appended claims. The illustrative examples, however, as well as a preferred mode of use, further objectives and features thereof, will be best understood by reference to the following detailed description of an illustrative example of the present disclosure when read in conjunction with the accompanying drawings, wherein:

DETAILED DESCRIPTION

Figure 1:
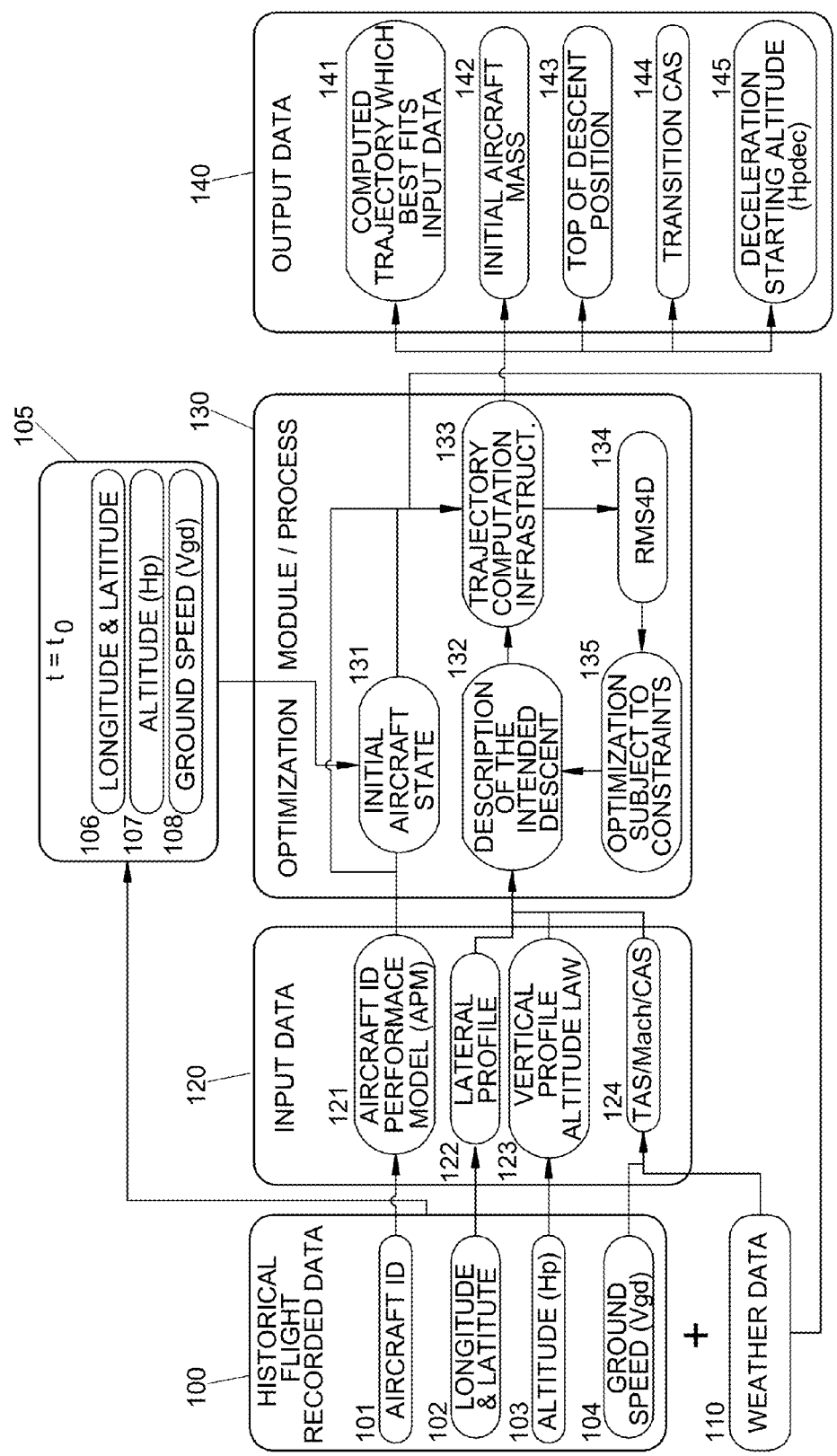
FIG. 1 is a diagram of the Architecture of the Adaptive Trajectory Prediction Infrastructure for Arrival Management.

The disclosure provides a method, which leverages the Aircraft Intent Description Language (AIDL)-based Trajectory Computation Infrastructure disclosed in the European Patent application with publication number EP-A1-2040137 for improving the prediction capabilities of any Trajectory Predictor (TP) used for Arrival Management by means of a continuous learning process. This learning process determines what values of the selected parameters provide the most accurate trajectory predictions according to the aircraft type-airline-intended descent procedure-weather conditions combination.

Assuming that any Trajectory Predictor (TP) is limited in the way that describes the trajectories to be predicted, which in turn derives into prediction errors, the proposed method aims at reducing such errors by a learning process which provides the adjustments required to the aircraft intent to obtain the minimum-error predictions. Those adjustments are obtained due to the application of an optimization process which matches historical recorded flight data with trajectory precisions by minimizing predefined error functions which evaluates the goodness of the fitting between the actual and the predicted trajectories. Once the process is applied to the historical traffic data within the considered area, it is possible to statistically infer the optimal values of the aircraft intent parameters which ensure high-accuracy predictions to be used for arrival management for a given combination of aircraft type-airline-intended descent procedure-weather conditions.

The disclosure represents an intent generation heuristic which can be applied to predict trajectories by means of an optimization of a limited description of the trajectory (limited aircraft intent description) and the use of historical recorded flight data.

The proposed methodology aims at reducing intrinsic predication errors by a continuous learning process which will increase the accuracy of the prediction of an aircraft approaching its destination aerodrome from the cruise level to a given point of interest (e.g. metering fix point.), considering as initial conditions the latest reported position (given by time, latitude, longitude, altitude and speed).

Examples of the present disclosure provide a method, which leverages the Aircraft Intent Description Language (AIDL)-based Trajectory Computation Infrastructure disclosed in the European Patent application with publication number EP-A1-2040137 for improving the prediction capabilities of any Trajectory Predictor (TP) used for Arrival Management by means of a continuous learning process. The entirety of EP-A1-2040137 is incorporated herein by reference. This learning process determines what values of the selected parameters provide the most accurate trajectory predictions according to the aircraft type-airline-intended descent procedure-weather conditions combination.

According to one aspect of the present disclosure, the proposed method is a computer-implemented method of predicting with high accuracy a descent trajectory described by means of the Aircraft Intent Description Language (AIDL). The method involves:

a) storing, in a database, actual descent trajectories of at least one aircraft of an airline for at least one airport, each trajectory being defined by a set of historical flight recorded data;

b) synchronising weather data with the set of historical flight recorded data, and storing the weather data in the database;

c) calculating input data from the historical flight recorded data, where the input data is a set of data used to obtain the values of the Aircraft Intent "AI" parameters which best fit the historical flight recorded data for each individual trajectory;

d) defining a parametric AI description which describes the aircraft intended descent from the initial aircraft state, where at least one parameter comprised in said parametric AI description is open and whose final value is obtained as an output of an optimization process; and, e) applying and repeating an optimization process until the optimization process converges to a solution of the AI parameters which minimizes a cost function which represents the error between the computed and actual trajectories, then providing the computed trajectory which best fits the original trajectory (considering the limitations of the considered Trajectory Predictor TP).

The method can additionally and optionally comprises the following step:

f) storing, in the database, the descent trajectory computed and the final value of the parameter in step e), the aircraft type, the airline and the weather conditions which identify a complete set of outputs.

The above mentioned optimization process involves the following operations:

i) computing a descent trajectory from the parametric AI which describes the aircraft intended descent, the Aircraft Performance Model "APM", the weather data and an initial aircraft state, by closing AI parameters with preliminary values compliance with defined optimization constraints;

ii) calculating an error between the computed descent trajectory and the actual trajectory;

iii) applying an optimization algorithm which modifies the value of the AI parameters; and, iv) re-formulating the parametric description of the aircraft intended descent with a new value of the AI parameters provided by the optimization algorithm.

The optimization algorithm can be any optimization algorithm known from the state of the art. For instance, the "simplex search" optimization algorithm disclosed in Lagarias [Lagarias, J. C., J. A. Reeds, M. H. Wright, and P. E. Wright, "*Convergence Properties of the Nelder-Mead Simplex Method in Low Dimensions,*" *SIAM Journal of Optimization*, Vol. 9 Number 1, pp. 112-147, 1998] [Lagarias, 1998]. The entirety of [Lagarias, 1998] is incorporated herein by reference.

Each set of historical flight recorded data comprises at least: an Aircraft identification number "Aircraft ID"; and, for each particular time, at least information about the following variables: longitude and latitude coordinates; an altitude "$H_p$"; and, a ground speed "$V_{gd}$".

The input data comprises at least one of the following datasets: an Aircraft Performance Model (APM), which is a representation of the performance of the considered aircraft; a lateral profile, which represents the projection of the trajectory into the ground surface by a function of the longitude coordinates and the latitude coordinates and their evolution with the time; a vertical profile, which represents the projection of the trajectory into a plane orthogonal to the ground surface by a function of the evolution of the altitude (typically, pressure altitude ($H_{pre}$) or geometric altitude ($H_{geo}$)) with the time; and, a function of the aircraft speed with the time selected from: True Airspeed (TAS), Mach number (M) and Calibrated Airspeed (CAS); said that True Airspeed (TAS), Mach number (M) and Calibrated Airspeed (CAS) can be directly obtained from the historical flight recorded data or calculated from them (from the ground speed ($V_{gd}$), for instance).

The initial aircraft state comprises: the longitude and latitude coordinates, the altitude "Hp" and the ground speed $V_{gd}$ of the aircraft at the initial time to, e.g., the entering time into the TMA.

In these examples, the mass of the aircraft, for complying with the optimization constraint, is selected between the Maximum Take-Off Weight (MTOW) and the Operating Empty Weight (OEW) and, the remaining variables are constrained to comply with the optimization constraint of being contained within the aircraft's flight envelope. In other words, in such examples the remaining variables (e.g., aircraft speeds) are constrained to comply with the optimization constraint of being contained within the aircraft's flight envelope. In some examples, the aircraft speed is higher than the stall speed for given flight conditions and lower than the maximum speed defined by the aircraft's maximum structural loads.

The error calculated in step e) of the above mentioned method is a root mean square error described by the following expression:

$$RMS_{AD}^2 = RMS_{vertical}^2 + RMS_t^2$$

where:

$RMS_{vertical}^2$ represents the deviation in altitude between the computed and actual trajectories at each given horizontal position (longitude ($\lambda$) & latitude ($\phi$)), so that: $RMS_{vertical}^2 = \Sigma(Hp(\lambda_i, \phi_i)_{computed} - Hp(\lambda_i, \phi_i)_{actual})^2/n$; and, where:

$RMS_t^2$ represents the deviation in time at each given horizontal position (longitude & latitude), so that: $RMS_t^2 = \Sigma(t(\lambda_i, \phi_i)_{computed} - t(\lambda_i, \phi_i)_{actual})^2/n$;

being:

n=the number of historical flight recorded data comprised in a trajectory;

t($\lambda$i, $\phi$i)actual=actual time at each recorded ($\lambda$i, $\phi$i);

tcomputed=computed time at each recorded ($\lambda$i, $\phi$i);

Hp($\lambda$i, $\phi$i)actual=actual pressure altitude at each recorded ($\lambda$i, $\phi$i);

Hp($\lambda$i, $\phi$i)computed=computed pressure altitude at each recorded ($\lambda$i, $\phi$i).

The stored and computed decent trajectory is described by an AI whose exposed parameters are the Top of Descent "TOD" the transition CAS and a deceleration starting altitude "$Hp_{dec}$, and completely determined by the definition of the initial aircraft mass "$m_0$".

The description of the aircraft intended descent is selected from idle descent and non-idle descent, both further comprising a deceleration segment. The deceleration segment is selected from a level-off segment and a speed reduction.

The idle descent is defined by an aircraft intent description comprising a first and a second longitudinal thread defining the vertical profile, which can be described by means of the AIDL as follows: i) the first longitudinal thread is described by a Hold-Speed Mach instruction (HS(M)) which ends at a floating trigger defined by the transition CAS followed by a Hold-Speed CAS instructions (HS (CAS)) which ends at a floating trigger defined by the altitude at which the deceleration maneuvers start; and, ii) simultaneously, the second longitudinal thread is defined by a Hold-Altitude (HA(Hp)) instruction which ends at a floating trigger defined by the TOD, followed by a Throttle-Law instruction with the specified low idle (TL(LIDL)) whose end trigger is linked to the end trigger of the first longitudinal thread.

The non-idle descent is defined by an aircraft intent description comprises a first and a second longitudinal thread defining the vertical profile, which can be described by means of the AIDL as follows: i) the first longitudinal thread is described by a Hold-Speed Mach (HS(M)) instruction which ends at a floating trigger defined by the transition CAS followed by a Hold-Speed CAS (HS(CAS)) instruction which ends at a floating trigger defined by the altitude at which the deceleration maneuvers starts; and, ii) simultaneously, the second longitudinal thread is defined by a Hold-Altitude (HA(Hp)) instruction which ends at a floating trigger defined by the TOD, followed by an Altitude-Law (AL(Hp)) instruction whose end trigger is linked to the end trigger of the first longitudinal thread.

The level-off segment is defined by an aircraft intent description comprising first and second longitudinal threads defining the vertical profile, which can be described by means of the AIDL as follows: i) the first longitudinal thread is described by a Hold-Altitude (HA(Hp)) instruction which ends at a floating trigger defined by 250 kn of CAS followed by a Hold-Speed CAS (HS(CAS)) instruction which ends at a floating trigger defined by of 10,000 ft of pressure altitude at which the level-off segment ends; and, ii) simultaneously, the second longitudinal thread is defined by a Hold-Throttle (HT(THRO)) instruction whose end trigger is linked to the end trigger of the first longitudinal thread.

The speed reduction in case of an idle rating is defined by an aircraft intent description comprising a first and a second longitudinal thread defining the vertical profile, which can be described by means of the AIDL as follows: i) the first longitudinal thread is described by a Speed-Law CAS (SL (CAS)) instruction which ends at a floating trigger defined by 250 kn of CAS followed by a Hold-Speed CAS (HS (CAS)) instruction which ends at a floating trigger defined by of 10,000 ft of pressure altitude at which level-off segment ends; and, ii) simultaneously, the second longitudinal thread is defined by a Throttle-Law instruction with the specified low idle (TL(LIDL)) whose end trigger is linked to the end trigger of the first longitudinal thread.

The speed reduction in case of a non-idle regime is defined by an aircraft intent description comprising a first and a second longitudinal thread defining the vertical profile, which can be described by means of the AIDL as follows: i) the first longitudinal thread (550) is described by a Speed-Law CAS (SL(CAS)) instruction which ends at a floating trigger defined by 250 kn of CAS followed by a Hold-Speed CAS (HS(CAS)) instruction which ends at a floating trigger defined by of 10,000 ft of pressure altitude at which level-off segment ends; and, ii) simultaneously, the second longitudinal thread is defined by a Hold-Altitude (HA(Hp)) instruction whose end trigger is linked to the end trigger of the first longitudinal thread.

Each computed trajectory is stored in the database in conjunction with the airline name, the APM used for computation, the description of the intended descent procedure with the final values of the identified parameters and the considered weather conditions.

A second aspect of the present disclosure is the use of the database generated according to the method of the first aspect of the present disclosure to enable a machine learning process which leverages information obtained from historical flight recorded data to improve the prediction capabilities of a limited Trajectory Predictor "TP" in support of the considered Arrival Manager capabilities.

An improvement is derived from the usage of the knowledge provided by this method which is stored by airline name, aircraft type, descent procedure and weather conditions. The exploitation of such information facilitates aircraft trajectory predictions due to the use of statistical descriptions of most likely values of the AI parameter(s) which can be used for predicting the trajectory of an aircraft of a specific airline flying a fixed descending procedure under known weather conditions.)

A preferred example of the proposed method schematically comprises the following operations:
1. create a database of historical flight recorded data (also known as recorded surveillance tracks) corresponding to descent trajectories into the airport of interest for each type of aircraft and for each type of airline. The aircraft types are listed by their performance (e.g., aircraft model like Boeing B747-400F, B767-300F, B767-300BCF, etc.);
2. estimate key aircraft intent parameters and initial conditions from each recorded trajectory based on a parametric AIDL representation of a descent trajectory;
3. map the estimated parameters to the specific aircraft type, airline and intended descent procedure (flight intent);
4. assign to each combination aircraft type-airline-intended descent procedure the most likely set of intent and initial conditions parameters for its descent trajectory based on the historical flight data stored in the database;
5. when a prediction is requested for an aircraft with a given aircraft type-airline-intended descent procedure combination, use the intent and initial conditions parameters given in step 4 to formulate the aircraft intent for that aircraft's decent trajectory and initial conditions for the trajectory computation.

FIG. 1 presents a depiction of the logical process of the method of the present disclosure which represents the architecture of a learning infrastructure capable of reducing the prediction errors based on the exploitation of historical flight recorded data.

The above proposed method, according to the preferred example, includes the following elements:

Historical Flight Recorded Data (Recorded Surveillance Data) 100. The proposed methodology uses trajectory data recorded from the surveillance systems (e.g., from the ADS-B infrastructure). At least, the set of recorded data has information about the Aircraft ID 101, the lateral profile flown by the aircraft (longitude and latitude coordinates 102), information about the vertical profile (basically the pressure altitude (Hp) 103 and the speed (ground speed ($V_{gd}$) 104 for instance) at which the aircraft is flying) and a model of the weather 110 (winds and atmosphere conditions) faced by the aircraft throughout the trajectory.

Input Dataset 120. Based on the historical flight recorded data (recorded surveillance data), the set of inputs is obtained. The basic information which is used as an inputs to the example process is: the Aircraft Performance Model (APM) 121 which can be obtained from the ICAO identifier, the lateral profile 122 which defines the route followed by the aircraft on the ground surface, the law of pressure altitudes (vertical profile) 123 with time or flown distance which describes the evolution of the trajectory in the vertical plane and the speeds 124 at each reporting instant (assuming that the ground speed and the weather conditions are known, there is a unique relationship with the True Airspeed (TAS), the Mach number (M) and the Calibrated Airspeed (CAS)).

Figure 2:
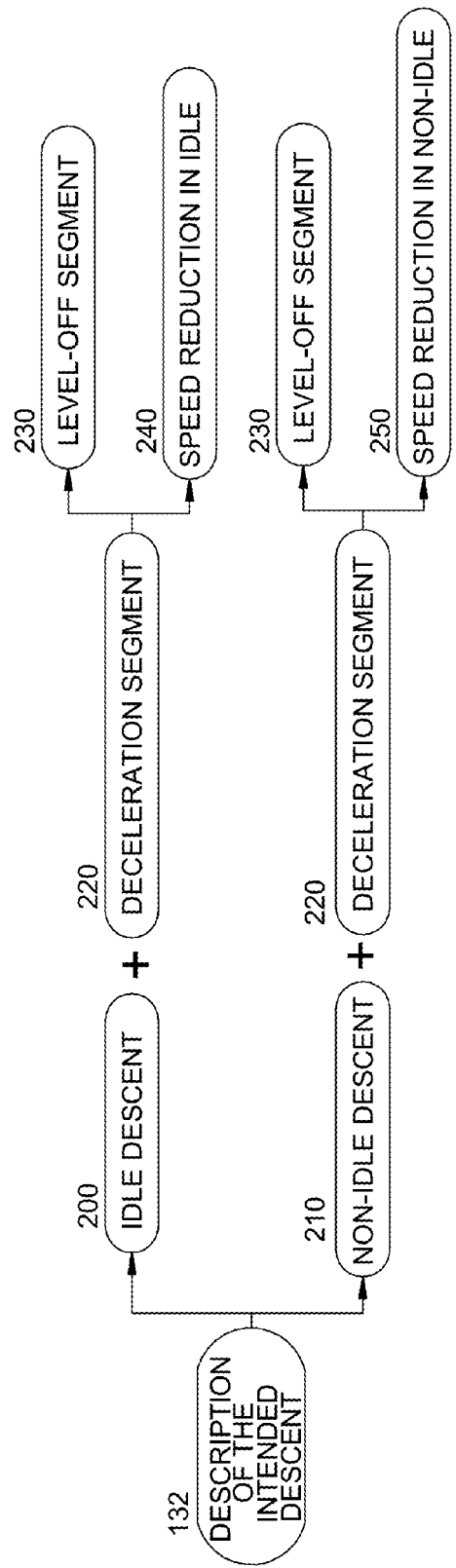
FIG. 2 is a diagram of Description of the Intended Descent.

Optimization Module 130. The target of the process is to find the trajectory which matches the input data with the minimum deviation. The optimization process uses the Initial Aircraft State 131 (which is obtained from the Historical Flight Recorded Data that contains the longitude and latitude 106, Altitude 107, Ground Speed Vgd 108 at a time $t_0$ 105); a Description of the Intended Descent 132 (this description depends strongly on the features of the considered Trajectory Predictor (TP) (FIG. 2 depicts a basic description using the AIDL and assuming a limited TP capability); a Trajectory Computation Infrastructure 133 (TCI) capable of managing AIDL instances; the error module $RMS_{4D}$ 134 (which calculates the error between the computed trajectory and the recorded data); and, the optimization process 135 subject to constraints (which modifies the values of the selected parameters to obtain a reduction of the measured error in the next trajectory computation).

Output Database 140. The main output of the process is the computed trajectory 141 which best fits the original historical flight recorded data (surveillance data) under the criterion of minimum $RMS_{4D}$. This trajectory is described by the three parameters which have been considered during the optimization process, which are the initial aircraft mass 142 at the beginning of the considered trajectory, the position of the TOD (Top of Descent Position) 143, the transition CAS 144 and the pressure altitude ($Hp_{dec}$) 145 at which the deceleration segment is triggered. The values of these three parameters define univocally the aircraft intent which represents the original trajectory. The outputs are stored in a database which allows defining a continuous learning process which enhances the prediction capabilities of the considered TP. This learning process provides improvements to predictions tailored to airlines and aircraft types.

According to the preferred example, the inputs to the process are:

Historical Flight Recorded Data (Recorded Surveillance Data). The disclosure makes use of historical flight data recorded 100 (surveillance data recorded) from real operations. There are different alternatives to obtain such set of data, but at least information about the aircraft type, the 4D position and the weather are used as inputs to the example process. A more complete set of surveillance data results in improvements to the process initialization. However, the main drawbacks to be solved are the lack of knowledge about the aircraft mass and the aircraft intent. Information about the aircraft mass is not available on ground because it may provide hints about the airlines' commercial strategy. Hence, the aircraft mass is calculated to obtain realistic prediction close to the actual trajectories. The aircraft intent can be theoretically defined by considering some assumptions about how the aircraft is to be operated within the TMA from cruise to a metering fixed point.

Weather Data. In some examples, a model of the wind field and atmosphere conditions is used for processing the recorded data and computing the predictions. This information may be a forecast provided by a meteorological agency, a re-analysis of a forecast incorporating actual weather measurements or even the actual conditions faced by the aircraft and saved in the Flight Data Recording System (FDRS).

According to the preferred example, the outputs of the process are:

Predicted trajectory which best fits the input data. After the optimization process, the prediction obtained is the trajectory which minimizes the $RMS_{4D}$ error regarding the input data. This trajectory can be considered the best possible predictions considering the limitations of the selected TP. These limitations imply that not all descending procedures can be accurately predicted. However, for those defined by a continuous descent, the process ensures predictions which match accurately the actual trajectories.

Initial Aircraft Mass. The process delivers the most probable value of the aircraft mass at the beginning of the trajectory which leads to the predicted trajectory which minimizes the error with respect to the original set of data.

Position of TOD. The process will deliver the position of the TOD which leads to the predicted trajectory which minimizes the error with respect to the original set of data. The actual position of the TOD can be obtained directly from the input data. If this position is fixed in the description of the aircraft intent, the $RMS_{4D}$ errors obtained are larger than those obtained if the TOD is calculated. In most cases, although the error in TOD position is not negligible, the minimization of the $RMS_{4D}$ errors justifies such deviation between the actual and calculated positions.

Transition CAS. The assumed limitations of the TP lead to an inflexible description of the descending procedure which is basically defined by the instructions depicted in FIG. 2. Although this may not represent exactly the flown aircraft intent, the considered description may represent accurately the actual trajectory if the transition CAS is correctly calculated. The optimization process ensures that the obtained transition CAS produces the minimum error (when combined with the values of the remaining parameters) independently of how close the assumed aircraft intent is to the real command and control strategies followed by the pilot or the Flight Management System (FMS).

Deceleration starting altitude. This is the altitude at which the airier initiates the deceleration procedure from the transition CAS to comply a predefined restriction, for instance, 250 kn at 10,000 ft.

An example of the method of the present disclosure includes the following:

Assuming that a set of recorded surveillance data is available and the corresponding weather conditions to the traffic to be analyzed, the first step defines a process for generating the set of inputs. This process provides information about the aircraft type and the conditions at the entrance to the Terminal Maneuvering Areas (TMA) which will be used afterwards in the trajectory computation infrastructure.

The set of inputs contain information about the lateral path which is assumed that follows the operational procedures in place within the TMA. The lateral profile is defined by the longitudes and latitudes which describes the evolution of the aircraft with time in the horizontal plane. This information can be directly fed to the computation infrastructure to ensure minimum deviations between the actual and computed lateral paths.

The initial pressure altitude and Mach speed are used for identifying the cruise phase, while the initial CAS value is considered as a constraint to be used in the optimization process (e.g., the transition CAS is constrained to be higher than the initial CAS).

The information about the evolution of the altitude as function of the horizontal position (longitude and latitude) allows obtaining the cruise altitude, the actual position of the TOD and the vertical profile during the descent. With those data, it is possible to close one of the two degrees of freedom which determines the vertical profile.

Figure 4:
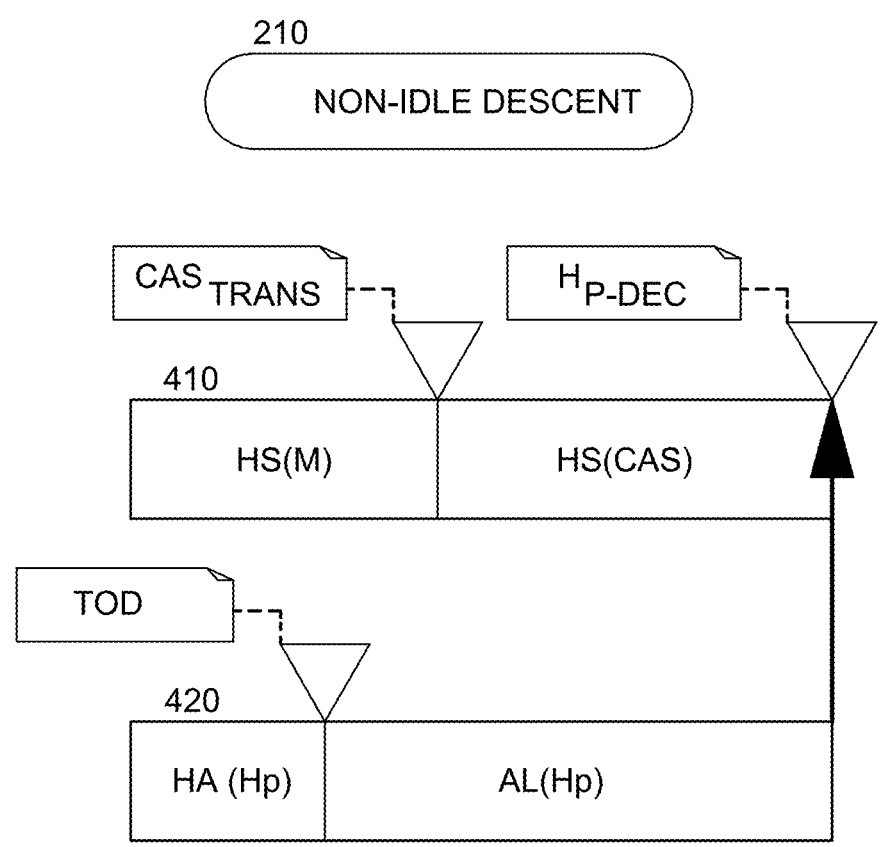
FIG. 4 is a diagram of NON-IDLE descent: vertical profile description
Figure 5:
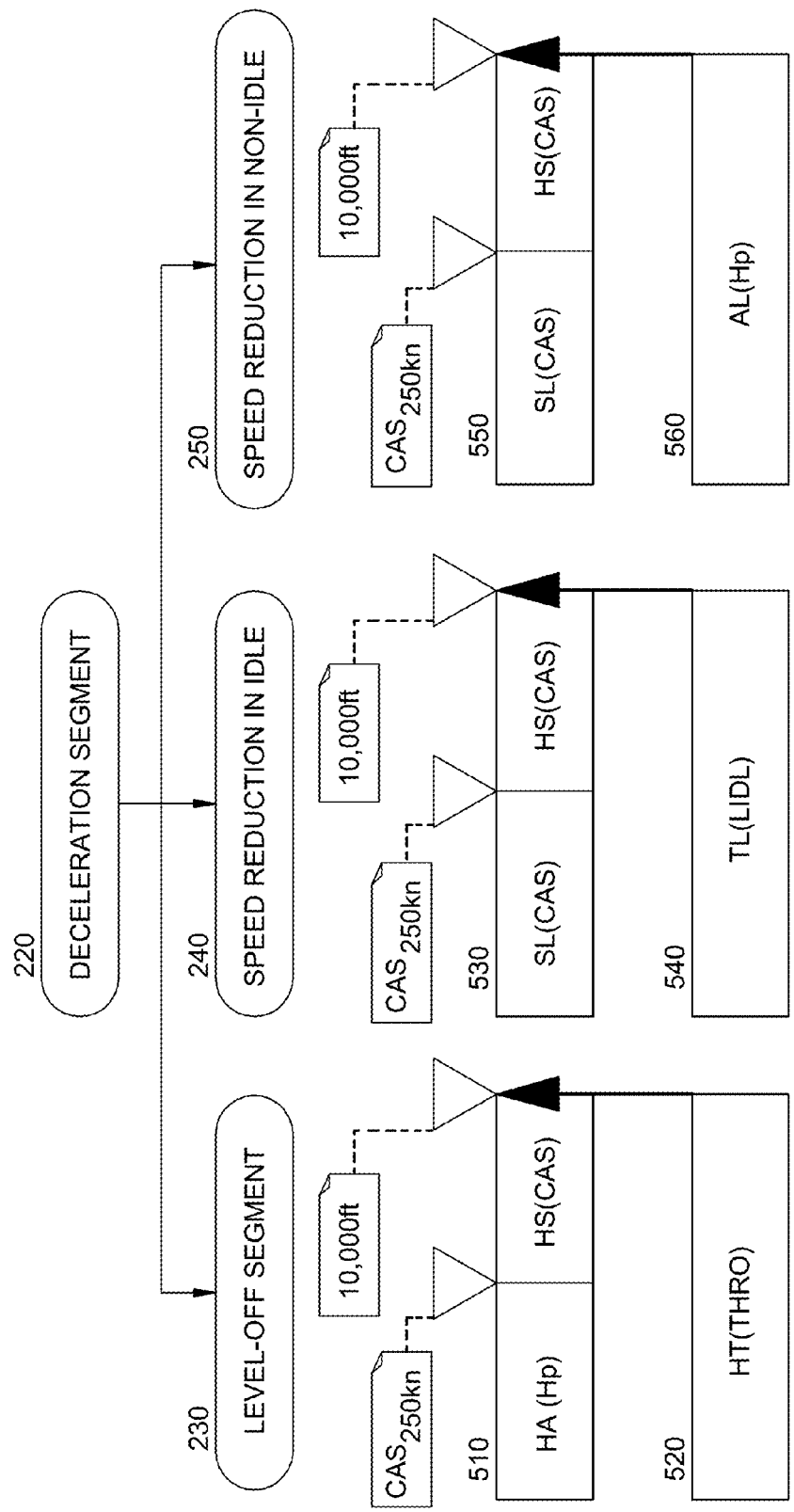
FIG. 5 is a diagram of DECELERATION SEGMENTS: vertical profile descriptions.

Once the set of inputs is ready, the optimization module defines a procedure to find the trajectory which minimizes the error regarding the original data. For that aim, the first step is to describe the trajectory through an AIDL instance. Considering that not the whole expressivity of the language can be managed by the selected TP, it is possible to use a simple description of a continuous descent procedure. In this case, two alternatives have been proposed, an idle descent 200 (FIG. 2) from cruise with a Mach/CAS transition 310 (FIG. 3) or a non-idle descent 210 with a Mach/CAS transition 410 (FIG. 4). A priori, there is no information to select one or the other, and therefore, both alternatives are evaluated. The aircraft intent also describes the deceleration process (also called as deceleration segment 220) from the transition CAS to the final CAS at the metering fixed point. This procedure can be executed by a level-off segment 230 (maintaining the engine regime the aircraft flies at constant altitude until reaching the target speed) or by a speed reduction 240,250 while descending (the speed law which defines the deceleration is obtained from the input data) as depicted in FIG. 5. In this case the situation is similar than above, no information about what the best approach is. Hence, each of the alternatives (200, 210, 220, 230, 240, 250) depicted in FIG. 2 is evaluated.

The optimization process is subject to constraints that ensure that the output trajectory is coherent and flyable. The basic constraints limit the variation of the initial mass within the maximum and minimum vales (between the Maximum Take-Off Weight (MTOW) and the Operating Empty Weight (OEW)). Additional constraints are used for building an aircraft intent instance that represents a real trajectory. As explained above, the transition CAS is constrained to be higher than the CAS at the TOD and equal or higher than the speed restriction at 10,000 ft (250 kn).

After defining the aircraft intent, 4 parameters are left open to the optimization process: the initial aircraft mass, the position of the TOD, the transition CAS and the deceleration staring altitude. For speeding up the process, properly selected initial values of such parameters are used. From the input data it is possible to obtain appropriate values the last three parameters, however, for the initial mass there is no information. In this case, the hypothesis considered is that the initial mass is the Maximum Landing Weight (MLW).

The optimization process targets the minimization of the deviations between the actual and computed trajectories defined by the RMS4D error. This error is a root mean square error described by the following expression:

$$RMS_{4D}^2 = RMS_{vertical}^2 + RMS_t^2$$

where: $RMS_{vertical}^2$ represents the deviation in altitude between the computed and actual trajectories at each given horizontal position (longitude ($\lambda$) & latitude ($\phi$)), so that: $RMS_{vertical}^2 = \Sigma(Hp(\lambda_i, \phi_i)_{computed} - Hp(\lambda_i, \phi_i)_{actual})^2/n$; and, where: $RMS_t^2$ represents the deviation in time at each given horizontal position (longitude & latitude), so that: $RMS_t^2 = \Sigma(t(\lambda_i, \phi_i)_{computed} - t(\lambda_i, \phi_i)_{actual})^2/n$;

being:
n=the number of historical flight recorded data comprised in a trajectory;
$t(\lambda i, \phi i)$actual=actual time at each recorded ($\lambda i, \phi i$);
tcomputed=computed time at each recorded ($\lambda i, \phi i$);
$Hp(\lambda i, \phi i)$actual=actual pressure altitude at each recorded ($\lambda i, \phi i$);
$Hp(\lambda i, \phi i)$computed=computed pressure altitude at each recorded ($\lambda i, \phi i$).

The optimization process is executed independently for the 4 possible aircraft intents which have been considered for the identification of the continuous descent operations. Once the process is finished, the alternative which returns the lower $RMS_{4D}$ error will be selected as the best representation of the actual trajectory and the 4 optimization parameters will be provided as output of the process.

In some examples, the process discussed above is repeated for all of the trajectories from which surveillance data are available. The outputs can be stored in a database which allows apply learning machine techniques to the data in order to build knowledge about how users (stored by aircraft type and airline) execute the operational procedures within the TMA under consideration. The inferred patterns can be used for improving the prediction capabilities on ground by tailoring the computation to the actual aircraft under control. For example, the analysis of the initial aircraft masses obtained by the process can provide a more accurate estimation of the mass to be fed to the prediction infrastructure when the same aircraft type of the same company is flying the same procedure as many times before.

Figure 3:
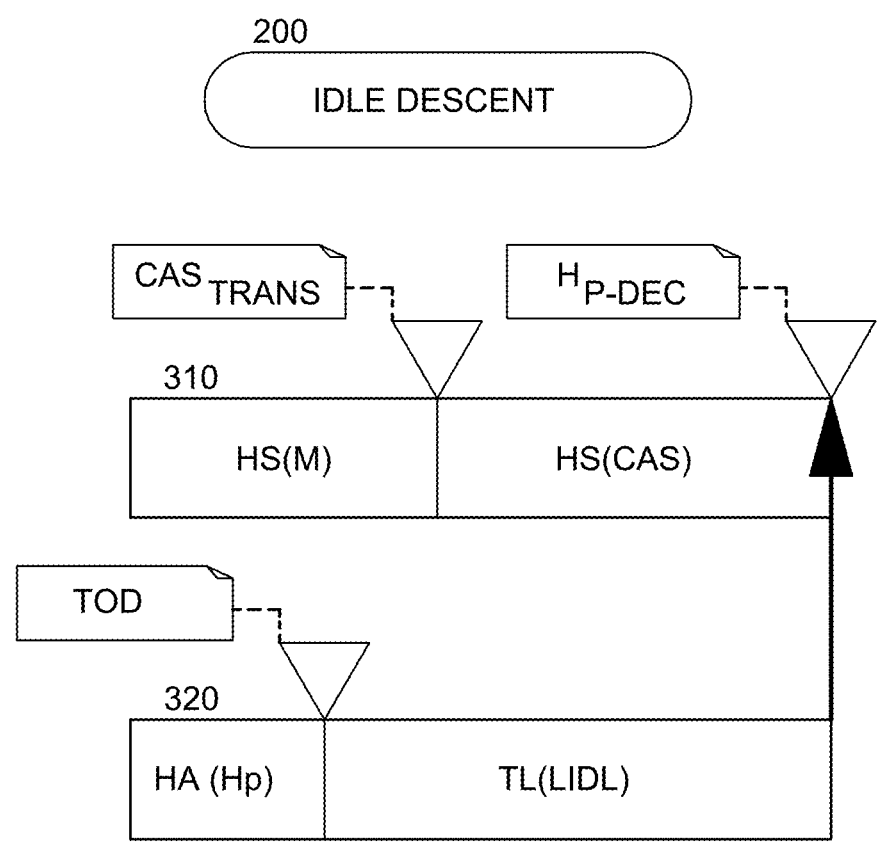
FIG. 3 is a diagram of IDLE descent: vertical profile description

FIG. 3 represents the idle descent 200 which is defined by an aircraft intent description comprising a first 310 and a second 320 longitudinal threads defining the vertical profile, which can be described by means of the AIDL as follows: i) the first longitudinal thread is described by a Hold-Speed Mach instruction (HS(M)) which ends at a floating trigger defined by the transition CAS followed by a Hold-Speed CAS instructions (HS(CAS)) which ends at a floating trigger defined by the altitude at the which deceleration maneuvers starts; and. ii) simultaneously, the second longitudinal thread is defined by a Hold-Altitude (HA(Hp)) instruction which ends at a floating trigger defined by the TOD, followed by a Throttle-Law instruction with the specified low idle (TL (LIDL)) whose end trigger is linked to the end trigger of the first longitudinal thread.

FIG. 4 represents the non-idle descent 210 which is defined by an aircraft intent description comprises a first 410 and a second 420 longitudinal threads defining the vertical profile, which can be described by means of the AIDL as follows: i) the first longitudinal thread is described by a Hold-Speed Mach (HS(M)) instruction which ends at a floating trigger defined by the transition CAS followed by a Hold-Speed CAS (HS(CAS)) instruction which ends at a floating trigger defined by the altitude at which the deceleration maneuvers starts; and, ii) simultaneously, the second longitudinal thread is defined by a Hold-Altitude (HA(Hp)) instruction which ends at a floating trigger defined by the TOD, followed by an Altitude-Law (AL(Hp)) instruction whose end trigger is linked to the end trigger of the first longitudinal thread.

FIG. 5 represents the level-off segment 230 which is defined by an aircraft intent description comprising a first and a second longitudinal threads defining the vertical profile, which can be described by means of the AIDL as follows: i) the first longitudinal thread 510 is described by a Hold-Altitude (HA(Hp)) instruction which ends at a floating trigger defined by 250 kn of CAS followed by a Hold-Speed CAS (HS(CAS)) instruction which ends at a floating trigger defined by of 10,000 ft of pressure altitude at which level-off segment ends; and, ii) simultaneously, the second longitudinal thread 520 is defined by a Hold-Throttle (HT(THRO)) instruction whose end trigger is linked to the end trigger of the first longitudinal thread. FIG. 5 also represents the speed reduction in case of idle rating 240 which is defined by an aircraft intent description comprising a first 530 and a second 540 longitudinal threads defining the vertical profile, which can be described by means of the AIDL as follows: i) the first longitudinal thread 530 is described by a Speed-Law CAS (SL(CAS)) instruction which ends at a floating trigger defined by 250 kn of CAS followed by a Hold-Speed CAS (HS(CAS)) instruction which ends at a floating trigger defined by of 10,000 ft of pressure altitude at which level-off segment ends; and, ii) simultaneously, the second longitudinal thread 540 is defined by a Throttle-Law instruction with the specified low idle (TL(LIDL)) whose end trigger is linked to the end trigger of the first longitudinal thread. In case of speed reduction with a non-idle regime 250, the deceleration segment is defined by an aircraft intent description comprising a first 550 and a second 560 longitudinal threads defining the vertical profile, which can be described by means of the AIDL as follows: i) the first longitudinal thread 550 is described by a Speed-Law CAS (SL(CAS)) instruction which ends at a floating trigger defined by 250 kn of CAS followed by a Hold-Speed CAS (HS(CAS)) instruction which ends at a floating trigger defined by of 10,000 ft of pressure altitude at which level-off segment ends; and, ii) simultaneously, the second longitudinal thread 560 is defined by a Hold-Altitude (HA(Hp)) instruction whose end trigger is linked to the end trigger of the first longitudinal thread.

While an example manner of implementing the methods described above are illustrated in FIGS. 1-5, one or more of the elements, processes and/or devices illustrated in FIG. 1-5 may be combined, divided, re-arranged, omitted, eliminated and/or implemented in any other way. Further, the example methods of FIGS. 1-5 may be implemented by hardware, software, firmware and/or any combination of hardware, software and/or firmware. Thus, for example, any of the example methods of FIGS. 1-5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example methods of FIGS. 1-5 is/are hereby expressly defined to include a tangible computer readable storage device or storage disk such as a memory, a digital versatile disk (DVD), a compact disk (CD), a Blu-ray disk, etc. storing the software and/or firmware. Further still, the example methods of FIGS. 1-5 may include one or more elements, processes and/or devices in addition to, or instead of, those illustrated in FIGS. 1-5, and/or may include more than one of any or all of the illustrated elements, processes and devices.

The example methods of FIGS. 1-5 may be implemented using machine readable instructions executed on a logic circuit. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example methods of FIGS. 1-5 may alternatively be used. For example, the order of execution of the blocks may be changed, and/or some of the blocks described may be changed, eliminated, or combined.

As mentioned above, the example processes of FIGS. 1-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer storage medium" and "tangible machine readable storage medium" are used interchangeably. Additionally or alternatively, the example processes of FIGS. 1-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 6:
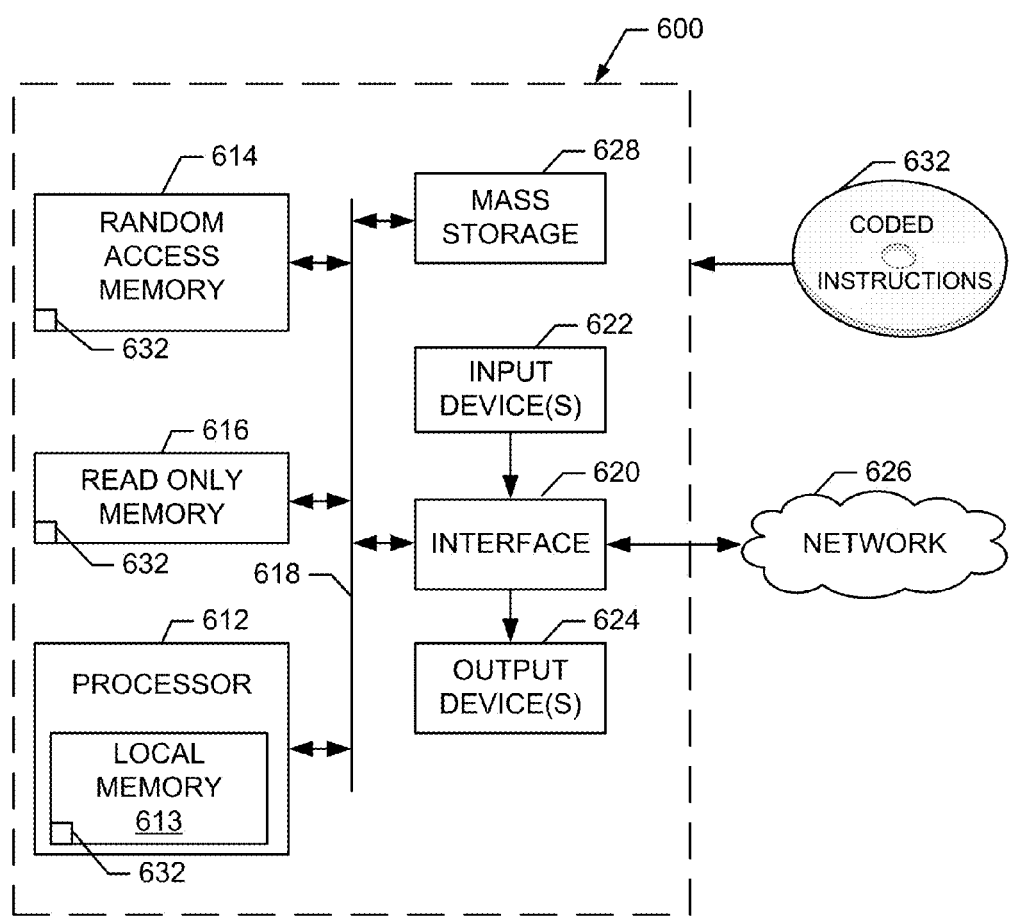
FIG. 6 is a block diagram of an example processor platform to implement the methods and apparatus disclosed herein.

FIG. 6 is a block diagram of an example processor platform 600 to implement the methods and apparatus disclosed above. The processor platform 600 can be, for example, a server, a personal computer, a laptop or notebook computer, a tablet computer, a mobile device, or any other type of computing device or combination of computing devices.

The processor platform 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory (e.g., read only memory (ROM) 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a voice recognition system, and/or any other method of input or input device.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device such as a modem or network interface card to facilitate exchange of data with external computers via a network 626 (e.g., an Ethernet connection, a wireless local area network (WLAN) connection, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives.

Coded instructions 632 to implement the methods described herein may be stored in the mass storage device 628, in the volatile memory 614, in the non-volatile memory 616, and/or on a removable storage medium such as a CD or DVD.

It is noted that this patent claims priority from European Patent Application Serial Number EP14382181, which was filed on May 23, 2014. The entirety of European Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A method comprising:
  accessing historical flight data for a recorded flight trajectory, the recorded flight trajectory having been performed by a first aircraft of a first aircraft type of multiple aircraft types and for a first airline of multiple airlines;
  calculating, using a trajectory predictor, a plurality of trajectories for the first aircraft using (1) an initial condition of the first aircraft, and (2) a plurality of values for an aircraft intent parameter;
  determining, using an optimization module, an optimal value of the plurality of values for the aircraft intent parameter that results in a calculated trajectory that best fits the recorded flight trajectory;
  mapping the optimal value of the aircraft intent parameter to a combination of the first aircraft type, the first airline, and an identified intended descent procedure;
  providing, in response to a request to predict a trajectory of a second aircraft of the first aircraft type, the first airline, and the identified intended descent procedure, the optimal value of the aircraft intent parameter from the optimization module to the trajectory predictor; and
  calculating, using the trajectory predictor, a trajectory of the second aircraft using (1) an initial condition of the second aircraft and (2) the optimal value of the aircraft intent parameter.

2. The method as defined in claim 1, further including storing the historical flight data for the recorded flight trajectory based on observing the recorded flight trajectory of the first aircraft of the first aircraft type and for the first airline, the historical flight data including positions of the first aircraft during an observed time period and weather information for the observed time period, the calculating of the plurality of trajectories being based on the positions of the first aircraft and the weather information.

3. The method as defined in claim 1, wherein the calculating of the plurality of trajectories includes:
  calculating, using the trajectory predictor, a lateral path of the first aircraft corresponding to the recorded flight trajectory based on an operational procedure associated with an airport that is associated with the recorded flight trajectory;
  calculating, using the trajectory predictor, a vertical profile of the first aircraft corresponding to the recorded flight trajectory and corresponding to the lateral path; and
  calculating, using the trajectory predictor, speeds of the first aircraft over the lateral path and the vertical profile, the calculating of the plurality of trajectories being based on the lateral path, the vertical profile, and the speeds.

4. The method as defined in claim 1, wherein the calculating of the plurality of trajectories includes:
  calculating, using the trajectory predictor, a first trajectory using a first value for the aircraft intent parameter and using a first aircraft intent procedure; and
  calculating, using the trajectory predictor, a second trajectory using a second value for the aircraft intent parameter and using a second aircraft intent procedure; and
  wherein the determining of the optimal value includes:
  determining, using the optimization module, a first total error between the first trajectory and the recorded flight trajectory;
  determining, using the optimization module, a second total error between the second trajectory and the recorded flight trajectory; and
  selecting, using the optimization module, the first value of the aircraft intent parameter as the optimal value of the aircraft intent parameter when the first total error is less than the second total error.

5. The method as defined in claim 4, wherein the calculating of the first trajectory includes applying a constraint to the first aircraft intent procedure to define the first aircraft intent procedure to be within a flight envelope of the first type of aircraft.

6. The method as defined in claim 4, wherein the first aircraft intent procedure is an idle descent defined based on a throttle-law instruction, and the second aircraft intent procedure is a non-idle descent defined based on an altitude-law instruction.

7. The method as defined in claim 4, wherein the calculating of the first trajectory using the first aircraft intent procedure includes describing the first aircraft intent procedure using an instance of aircraft intent description language, the instance including at least one of an idle descent or a non-idle descent and describing a deceleration process of the idle descent or the non-idle descent using at least one of a level-off segment or by a speed reduction.

8. The method as defined in claim 1, wherein the historical flight data includes combinations of a longitude coordinate, a latitude coordinate, an altitude, and a ground speed.

9. The method as defined in claim 1, wherein the initial condition of the first aircraft includes longitude and latitude coordinates, an altitude, and a ground speed of the first aircraft corresponding to the recorded flight trajectory.

10. The method as defined in claim 1, wherein the calculating of the plurality of trajectories is based on an aircraft performance model of the first aircraft corresponding to the recorded flight trajectory.

11. The method as defined in claim 1, wherein the second aircraft is an aircraft approaching a terminal maneuvering area.

12. The method as defined in claim 1, wherein the aircraft intent parameter is a mass of the first aircraft.

13. A tangible computer readable storage medium comprising computer readable instructions which, when executed, cause a processor to at least:
access historical flight data for a recorded flight trajectory, the recorded flight trajectory having been performed by a first aircraft of a first aircraft type of multiple aircraft types and for a first airline of multiple airlines;
calculate, using a trajectory prediction process, a plurality of trajectories for the first aircraft using (1) an initial condition of the first aircraft, and (2) a plurality of values for an aircraft intent parameter;
determine, using an optimization process, an optimal value of the plurality of values for the aircraft intent parameter that results in a calculated trajectory that best fits the recorded flight trajectory;
map the optimal value of the aircraft intent parameter to a combination of the first aircraft type, the first airline, and an identified intended descent procedure; and
calculate, using the trajectory prediction process, in response to a request to predict a trajectory of a second aircraft of the first aircraft type, the first airline, and the identified intended descent procedure, a trajectory of the second aircraft using (1) an initial condition of the second aircraft and (2) the optimal value of the aircraft intent parameter.

14. The storage medium as defined in claim 13, wherein the instructions are further to cause the processor to store the historical flight data for the recorded flight trajectory based on observing the recorded flight trajectory of the first aircraft of the first aircraft type and for the first airline, the historical flight data including positions of the first aircraft during an observed time period and weather information for the observed time period, the instructions to cause the processor to calculate the plurality of trajectories based on the positions of the first aircraft and the weather information.

15. The storage medium as defined in claim 13, wherein the instructions are to cause the processor to calculate, using the trajectory prediction process, the plurality of trajectories by:
calculating a lateral path of the first aircraft corresponding to the recorded flight trajectory based on an operational procedure associated with an airport that is associated with the recorded flight trajectory;
calculating a vertical profile of the first aircraft corresponding to the recorded flight trajectory and corresponding to the lateral path; and
calculating speeds of the first aircraft over the lateral path and the vertical profile, the instructions to cause the processor to calculate the plurality of trajectories based on the lateral path, the vertical profile, and the speeds.

16. The storage medium as defined in claim 13, wherein the instructions are to cause the processor to calculate, using the trajectory prediction process, the plurality of trajectories by:
calculating a first trajectory using a first value for the aircraft intent parameter and using a first aircraft intent procedure; and
calculating a second trajectory using a second value for the aircraft intent parameter and using a second aircraft intent procedure; and
wherein, the instructions are to cause the processor to determine, using the optimization process, the optimal value by:
determining a first total error between the first trajectory and the recorded flight trajectory;
determining a second total error between the second trajectory and the recorded flight trajectory; and
selecting the first value of the aircraft intent parameter as the optimal value of the aircraft intent parameter when the first total error is less than the second total error.

17. The storage medium as defined in claim 16, wherein the instructions are to cause the processor to calculate the first trajectory by applying a constraint to the first aircraft intent procedure to define the first aircraft intent procedure to be within a flight envelope of the first type of aircraft.

18. The storage medium as defined in claim 16, wherein the first aircraft intent procedure is an idle descent defined based on a throttle-law instruction, and the second aircraft intent procedure is a non-idle descent defined based on an altitude-law instruction.

19. The storage medium as defined in claim 16, wherein the instructions are to cause the processor to calculate the first trajectory using the first aircraft intent procedure by describing the first aircraft intent procedure using an instance of an aircraft intent description language, the instance including at least one of an idle descent or a non-idle descent and describing a deceleration process of the idle descent or the non-idle descent using at least one of a level-off segment or by a speed reduction.

20. The storage medium as defined in claim 13, wherein the historical flight data includes combinations of a longitude coordinate, a latitude coordinate, an altitude, and a ground speed.

21. The storage medium as defined in claim 13, wherein the initial condition of the first aircraft includes longitude and latitude coordinates, an altitude, and a ground speed of an aircraft corresponding to the recorded flight trajectory.

22. The storage medium as defined in claim 13, wherein the instructions are to cause the processor to calculate the plurality of trajectories based on an aircraft performance model of the first aircraft corresponding to the recorded flight trajectory.

* * * * *